June 29, 1937.  A. H. BOILEAU  2,085,291
SAFETY DEVICE FOR ICE CREAM FREEZERS AND THE LIKE
Filed Feb. 2, 1935   2 Sheets-Sheet 1
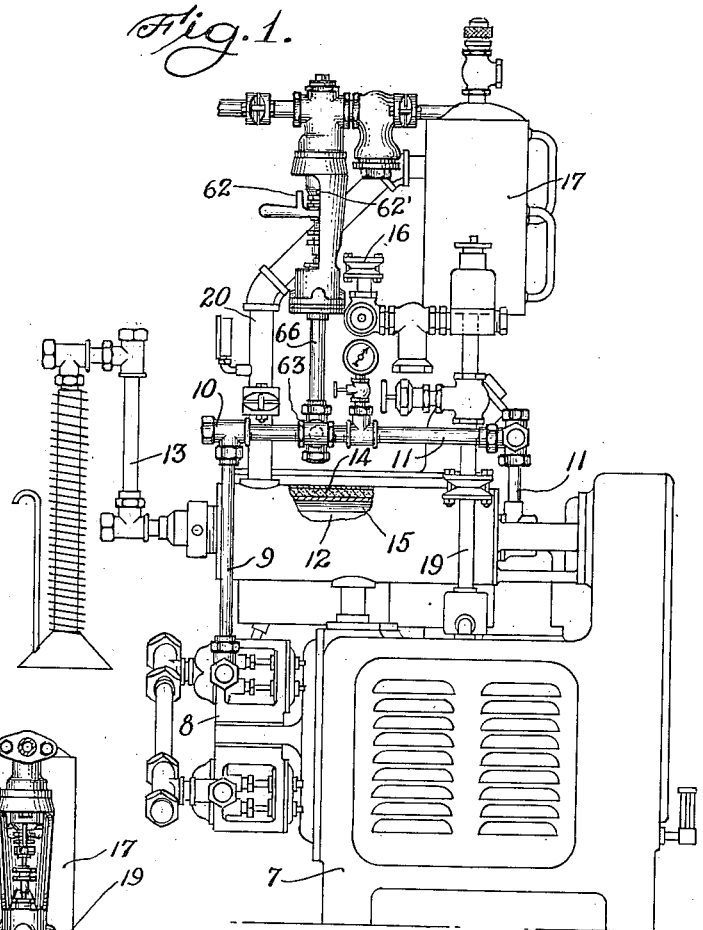
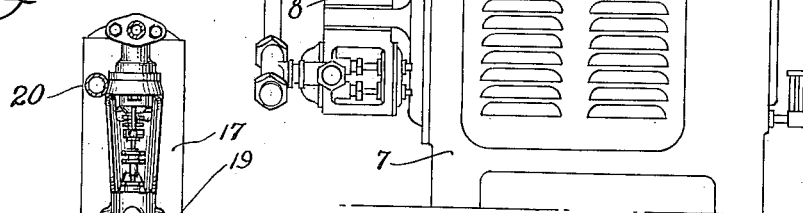
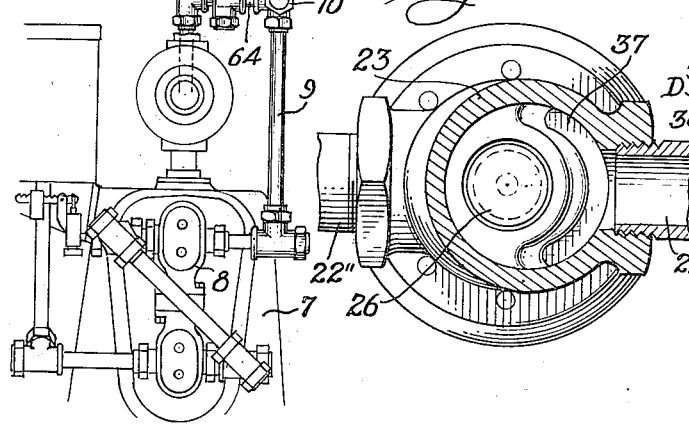
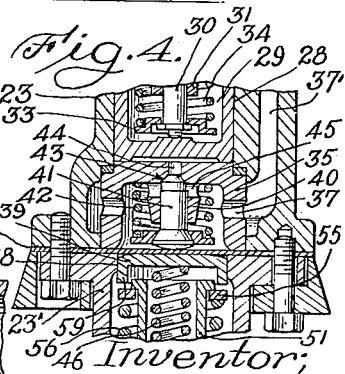
Inventor:
Arthur H. Boileau
BY
Wm. O. Belt
Attorney.

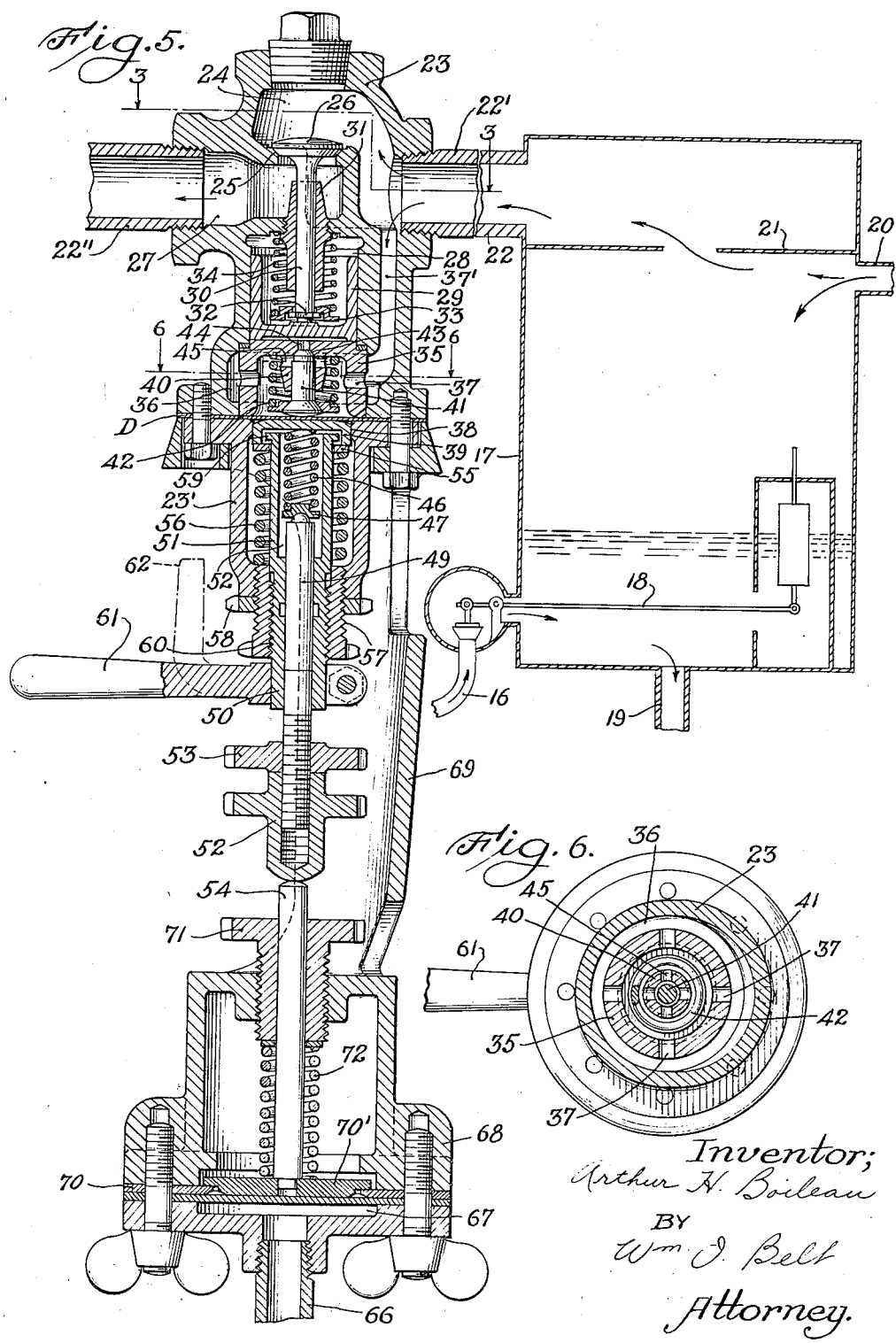

Patented June 29, 1937

2,085,291

UNITED STATES PATENT OFFICE 2,085,291

SAFETY DEVICE FOR ICE CREAM FREEZERS
AND THE LIKE

Arthur H. Boileau, Cedar Rapids, Iowa, assignor
to Cherry-Burrell Corporation, Cedar Rapids,
Iowa, a corporation of Delaware Application February 2, 1935, Serial No. 4,641

18 Claims. (Cl. 62—114)

This invention relates to safety devices for ice cream freezers and the like. A particular use of my safety device is on continuous ice cream freezers wherein an aerated ice cream mix is continuously forced through a freezing chamber to be frozen, and among the objects of my invention are to prevent overloading of the means which force the mix through the freezing chamber and to prevent damage to the operating parts of the freezer under abnormal operating conditions.

Other objects are to reduce the freezing of a product forced through a freezing chamber under pressure upon a predetermined increase in the forcing pressure; to control the evaporating pressure of the refrigerant effecting the freezing and thereby control the refrigerating temperature; to increase the evaporating pressure when refrigeration is effected too rapidly; and to provide a novel safety device of simple and economical construction and efficient and positive operation.

A selected embodiment of the invention is illustrated in the accompanying drawings wherein Fig. 1 is a side elevation of a continuous ice cream freezer having my novel safety device thereon;

Fig. 2 is a fragmentary elevation of the left hand end of the freezer shown in Fig. 1;

Fig. 3 is a sectional detail view taken substantially on the line 3—3 on Fig. 5;

Fig. 4 is a fragmentary vertical sectional view of the refrigeration control for the freezer and showing certain parts in one operative position;

Fig. 5 is a vertical sectional view of the refrigeration control and my safety device and showing the parts illustrated in Fig. 4 in another operating position and wherein an accumulator is diagrammatically illustrated; and Fig. 6 is a transverse sectional view taken substantially on the line 6—6 on Fig. 5.

In the accompanying drawings 7 indicates the base of a continuous ice cream freezer. A pair of pumps 8 are mounted at one end of the base and serve to meter and force intermingled ice cream mix and air through the pipe 9, as described in my Patent No. 1,907,468, patented May 9, 1933. The pipe 9 leads to a fitting 10 from which a mix supply pipe 11 leads to one end of the freezing chamber 12 wherein the ice cream mix is frozen and from which frozen ice cream is discharged through the outlet 13. Operative means are provided in the freezing chamber in contact with the aerated mix and these means are driven by a power device mounted on the base 7. An insulated wall 14 is spaced from the periphery of the freezing chamber 12 to provide a refrigerating chamber 15 about the freezing chamber.

A refrigerant supply pipe 16 leads from the condenser of a refrigerating system to an accumulater 17 and flow of liquid refrigerant from the pipe 16 into the accumulator 17 is controlled in a suitable manner as by the float valve device 18 diagrammatically illustrated in Fig. 5. A liquid refrigerant supply pipe 19 leads from the accumulator 17 to the refrigerating chamber 15 wherein the liquid refrigerant is evaporated to freeze the mix in the freezing chamber 12. The evaporated refrigerant is returned to the accumulator 17 through the vapor return pipe 20 which opens into the accumulator below a baffle 21 therein. The baffle prevents liquid refrigerant passing from the accumulator into the suction return pipe 22 which leads to the suction side of the compressor of the refrigerating system.

As illustrated, the refrigeration control for the freezer includes a valve having a body 23 in which there is an inlet chamber 24 having a valve seat 25 in the lower wall thereof. A valve 26 seats on the valve seat 25 and prevents flow from the chamber 24 into the outlet chamber 27 in the body 23. The part 22' of the suction return pipe 22 leads from the accumulator 17 to the inlet chamber 24 and the part 22'' of the suction return pipe leads from the outlet chamber 27 to the suction side of the compressor.

The valve body 23 includes a cylinder 28 in which a piston 29 is mounted for reciprocation. The stem 30 of the valve 26 extends through a guide 31 and the lower end thereof rests on the piston 29. A washer 32 is fast near the lower end of the stem 30 and a button 33 rests on the washer 32. The lower end of a spring 34 acts against this button, the other end of this spring seating against the top of the cylinder 28. The spring 34 serves to tightly seat the valve 26 on the valve seat 25 and to position the piston 29 at the lower end of the cylinder 28.

A pilot valve housing 35 is provided in the body 23 below the cylinder 28. A chamber 36 is provided in the body 23 about the pilot valve housing 35. A vertical passage 37' interconnects the chambers 24 and 36 so that vapor refrigerant flowing into the chamber 24 from the suction return line 22' also enters the chamber 36. Communication between the chamber 36 and the interior of the pilot valve housing 35 is established through openings 37. The lower ends of the body 23 and the housing 35 are open and the open upper end of the body 23' is fast to the body 23 at the open end thereof. A diaphragm D is fast between the bodies 23 and 23' and closes the open ends of body 23', body 23 and housing 35. A guide 40 is centrally mounted in the pilot valve housing 35 and a pilot valve 41 is mounted therein, the lower end of this pilot valve resting on the diaphragm D. A spring 42 in the pilot valve housing 35 forces the pilot valve 41 toward the diaphragm and tends to unseat the pilot valve from the valve seat 43 at the lower end of the passage 44 which leads to the cylinder 28 below the head of the piston 29. A plurality of openings 45 extend between the interior of the pilot valve housing 35 and the valve seat 43. The pressure of vapor refrigerant admitted into the pilot valve housing 35 through the openings 37 acts on the diaphragm to force the same downwardly whereupon the spring 42 unseats the pilot valve 41 from the valve seat 43 and the vapor refrigerant flows through the openings 45 past valve seat 43 and through passage 44 into cylinder 28. The pressure of the vapor refrigerant on the piston 29 moves said piston and forces the valve 26 off valve seat 25 against the action of spring 34 whereupon vapor refrigerant may flow from the inlet chamber 24 into the outlet chamber 27 and thence through pipe 22" to the suction side of the compressor of the refrigerating system.

There is free communication between the refrigerating chamber 15 and the accumulator 17 through pipes 19 and 20. Moreover, the valve 26 controls the discharge from the accumulator 17 through suction pipe to the compressor of the refrigerating system. Thus by controlling the opening of the valve 26 the pressure maintained in the accumulator 17 and the chamber 15 may be controlled. The pressure maintained in the chamber 15 regulates the evaporation of the liquid refrigerant therein and by maintaining predetermined pressures in the chamber 15 correlated temperatures can be established about the freezing chamber 12.

Therefore, means are provided which act on the diaphragm D to prevent opening of the pilot valve 41 until a predetermined pressure is built up in the refrigerating chamber 15, accumulator 17 and chamber 24. Further, since it is desired to interrupt freezing in the chamber 12 from time to time, the means which act on the diaphragm are preferably arranged to enable refrigerating or non-refrigerating temperatures to be set up.

The means acting on the diaphragm D includes a shoe 39 mounted in the guide opening 38 at the upper end of the body 23' and engaging the diaphragm. A spring 46 extends between the underside of the shoe 39 and the button 47 mounted on the upper end of a rod 49 which extends through the bearing 50 of the sleeve 51 that has a recess 52 at the upper end thereof in which the spring 46 and button 47 are mounted. The lower end of the rod 49 is screw threaded into an adjusting nut 52 and a lock nut 53. The adjusting nut is supported in a normal position so that movement thereof varies the position of the rod 49 whereby tension of the spring 46 may be adjusted to vary the force exerted upon the shoe 39 and the diaphragm D. Such adjustment varies the refrigerative temperature set up about the freezing chamber 12. In the present instance the nut 52 is supported by the stem 54 which is a part of my safety device and which is held in a normal position until my safety device operates.

As stated, by adjusting the nut 52 the position of the rod 49 may be varied to adjust the tension of the spring 46 and, for example, when the parts are arranged as shown in Fig. 4 the spring 46 may be so adjusted that it will so act on the shoe 39 that the diaphragm D will be held against movement until a predetermined pressure is exerted thereon whereby the pilot valve 41 is held seated on the valve seat 43 until the predetermined pressure is exerted on the diaphragm D. The spring may be so adjusted that the diaphragm will be held against movement until a pressure of about fifteen pounds is exerted on the diaphragm. When subjected to such pressure the diaphragm moves downwardly whereupon the spring 42 retracts the pilot valve 41 and permits vapor to act on the piston 29 to open the valve 26 as described. Opening of the valve 26 permits vapor to flow through the pipe 22" to the suction side of the compressor, and when sufficient vapor has been withdrawn to reduce the vapor pressure to below fifteen pounds the spring 46 moves the shoe 39 and the diaphragm upwardly whereupon the pilot valve 41 seats on the valve seat 43 and the spring 34 reseats the valve 26 on the valve seat 25. In this way a pressure of substantially fifteen pounds is maintained in the refrigerating chamber 15 and a refrigerating temperature corresponding to this pressure is established about the freezing chamber 12 to freeze the mix therein.

The freezing action in the freezing chamber 12 may be interrupted by raising the pressure in the refrigerating chamber and this may be attained by arranging the parts in the manner shown in Fig. 5 wherein it will be seen that a washer 55 is engaged with the bottom of the shoe 39 and that a strong spring 56 acts on this washer to urge it upwardly, the lower end of this spring resting against an adjusting nut 57 screwed into the lower end of the body 23'. The nut 57 is retained in adjusted positions by the lock nut 58. A flange 59 is provided at the upper end of the sleeve 51 and is engaged with the upper side of the washer 55. The periphery of the bearing portion 50 of the sleeve 51 is screw threaded and is mounted in a tapped opening in the nut 57, as indicated at 60. A handle 61 is fast on the bearing portion 50 of the sleeve 51 below the lower end of the nut 57, and this handle has an upstanding stop 62 thereon. When the handle 61 is arranged in the position illustrated in Figs. 1 and 5, the sleeve 51 will be in an upper position so that the flange 59 is free from the washer 55 and consequently both the springs 46 and 56 are effective on the shoe 39, and this combined effect of the springs is such that the shoe 39 holds the diaphragm against movement until a relatively high pressure, as for example, substantially sixty pounds, is impressed thereon. Hence, when the parts are arranged as shown in Fig. 5, a relatively high pressure will be maintained in the chamber 24, accumulator 17 and refrigerating chamber 15 which raises the refrigerating temperature and interrupts the freezing action in the freezing chamber 12.

When the handle 61 is grasped and turned in a clockwise direction, as viewed in Fig. 6, the upstanding stop 62 thereon may be moved into engagement with the fixed stop 62', Fig. 1, on the body 23'. This moves the sleeve 51 through the tapped opening in the nut 57 and engages the shoulder 59 with the washer 55 and urges this washer downwardly out of engagement with the shoe 39 whereupon the parts are arranged as shown in Fig. 4 and only the spring 46 is effective on the shoe 39 and diaphragm D so that the diaphragm will again be operative when a relatively low pressure, of, for example, fifteen pounds, is impressed thereon. It is to be understood that the reference herein to pressures is merely for the purpose of illustration for strong or weak springs may be used with the shoe 39, and moreover the tension of the spring 46 may be adjusted by means of the nut 52 and the tension of the spring 56 may be adjusted by means of the nut 59.

I prefer to use my safety device in connection with an arrangement such as the foregoing but, as will be readily apparent to one skilled in the art, it may be used with arrangements other than that described.

My novel safety device may be used conveniently with a continuous ice cream freezer such as that described for when the mix is frozen too rapidly its consistency is raised and much more pressure must be exerted to force the mix through the freezing chamber 12, and it is more difficult for the operating parts of the freezer to move therethrough with the result that the pumps 8 are overloaded and the operating parts of the freezer are subjected to unusual strains. Thus too rapid freezing of the mix in the freezing chamber 12 will be indicated by a rise in pressure in the mix supply pipe 11. This rapid freezing may be due to the fact that an insufficient quantity of mix is being supplied to the chamber 12 or it may be due to the establishing of too low a refrigerating temperature or to other causes. My safety device operates to prevent raising the consistency of the mix to such a degree that the pumps will be overloaded and the operating parts of the freezer will be subjected to undue strains. Thus my safety device, as in the illustrated embodiment of the invention, may be arranged to increase the evaporating pressure in the refrigerating chamber 15 and thereby raise the referigerating temperature about the chamber 12.

It has been stated that the adjusting nut 52 is retained in a normal position and that by manipulation of this nut the position of the rod 49 may be adjusted to vary the tension of the spring 46 whereby the evaporating pressure established in the chamber 15 may be adjusted to control the refrigerating temperature. It has also been stated that the adjusting nut 52 is rested on the stem 54 and thus in the normal operation of the machine the stem 54 is maintained in a normal position. However, if the stem 54 is moved out of its normal position it may effect the same result as adjustment of the nut 52, that is to say, it may increase the tension of the spring 46 and therefore raise the refrigerating temperature. Thus, my novel safety device is arranged to be responsive to a rise in pressure in the mix supply pipe 11 to thereupon move the stem 54. The safety device, however, is arranged for such operation only when the pressure is raised in an amount which would tend to overload the pumps 8 or impress undue strains upon the operating parts of the freezer.

My novel safety device therefore includes a pressure responsive device which, in the present instance, embodies a housing 68 having a chamber 67 therein in which a diaphragm 70 is mounted. In the illustrated form of the invention the housing 68 is supported in vertical alignment with the body 23' by a web 69 depending from said body 23'.

A fitting such as 63, Fig. 1, is provided in the mix supply pipe 11 and a pipe 64, Fig. 2, is connected thereto. The pipe 64 is also connected to a fitting 65 to which a pipe 66 is connected, and the pipe 66 leads to the chamber 67 so that the chamber 67 is in communication with the mix supply pipe 11 and changes in pressure in the mix supply pipe 11 are therefore effective on the diaphragm 70 in the chamber 67.

Slight changes in pressure in the mix supply pipe 11 are not detrimental and I therefore arrange my safety device to be operative only when the pressure in the mix supply pipe rises in a predetermined amount. Thus, for example, if the normal pressure in the mix supply pipe is fifty pounds, I arrange my safety device to be operative only after the pressure has risen to fifty-five or sixty pounds or even more, if desired. To this end I extend a spring 72 between the shoe 70' that rests on the diaphragm 70 and an adjusting nut 71 mounted in the housing 68. The stem 54 extends into the housing 68 through the adjusting nut 71 and the spring 72 and is connected with the shoe 70'. The adjusting nut 71 may be moved to vary the tension of the spring 72.

The spring 72 is adjusted to exert sufficient force on the shoe 70' and the diaphragm 70 that the diaphragm is held against movement and in a normal position until a predetermined pressure above the normal pressure has been impressed thereon. Hence, as stated, where the normal pressure in the mix supply pipe is fifty pounds, the spring 72 may be adjusted to hold the diaphragm 70 in its normal position until a pressure of, for example, fifty-five pounds is impressed on the diaphragm 70. Consequently, the diaphragm 70 will remain in a normal inoperative position until an abnormal pressure is built up in the mix supply pipe 11 and since the stem 54 is connected to the shoe 70' it will, in the normal operation of the machine, remain in a normal position and adjustment of the spring 46 may be effected, as described, by manipulating the nut 52.

When an abnormal condition arises and the pressure in the mix supply pipe 11 and therefore the chamber 67 rises in an amount sufficient to overcome the action of the spring 72, the diaphragm 70 moves which also moves the stem 54. This increases the tension of the spring 46 which therefore acts on the shoe 39 and the diaphragm D to prevent movement of said diaphragm until a higher pressure than that to which the diaphragm was responsive when the stem 54 was in its normal position is impressed on said diaphragm. Therefore, a higher pressure will be established in the refrigerating chamber 15 which will raise the refrigerating temperature and reduce the freezing action in the chamber 12 which will reduce the consistency to which the mix is frozen and reduction of the consistency of the mix will reduce the load on the pumps 8 and the strains on the operating parts of the freezer. Moreover, the reduction of the consistency of the mix will reduce the pressure in the pipe 11 and therefore the chamber 67 whereupon the spring 72 will return the diaphragm 70 and stem 54 to normal position which will retension spring 46 for normal operation and normal conditions will be reestablished in the freezer. A specific example of the foregoing operation is that if the spring 46 is normally so tensioned that the diaphragm D is responsive to a pressure of fifteen pounds and under these conditions the pressure in the mix supply pipe is normally fifty pounds, an increase in pressure of five pounds in the mix supply pipe will so increase the tension of the spring 46 that the diaphragm D will be held against movement until a pressure of eighteen pounds has been impressed thereon which will raise the evaporating pressure in the refrigerating chamber 15 and therefore reduce the freezing action about the chamber 12.

I have explained my safety device as it is used with a valve acting to maintain predetermined pressures in a refrigerating chamber but it is to be understood that this safety device could be used with any device having adjustable means therein and acting to maintain a predetermined temperature, and while I have illustrated and described a preferred embodiment of my invention it is to be understood that this is capable of variation and modification and I therefore do not wish to be limited to the precise details set forth but desire to avail myself of such changes and alterations as fall within the purview of the following claims.

I claim:

1. A safety device for use with a machine through which a product to be frozen is forced under pressure and having means for maintaining a predetermined freezing temperature, means for adjusting the temperature maintaining means, and pressure responsive means associated with the adjusting means and in communication with the product and operable to actuate the adjusting means upon variations of the product back pressure to adjust the temperature maintaining means and vary the freezing temperature.

2. In a safety device for use with a machine having a freezing chamber, means for forcing a product to be frozen through said chamber under pressure, and means for maintaining a predetermined freezing temperature about said chamber, means for adjusting the temperature maintaining means, and pressure responsive means associated with the adjusting means and in communication with the product and operable to actuate the adjusting means to adjust the temperature maintaining means to raise the freezing temperature when said product is being frozen too rapidly and the back pressure thereof in said chamber increases whereby overloading of the means forcing the product through the chamber is prevented.

3. In a safety device for use with a machine having a freezing chamber, a refrigerating chamber about the freezing chamber, means for forcing a product to be frozen through said freezing chamber under pressure, and means for controlling a refrigerant in said refrigerating chamber and operable to maintain a predetermined temperature about said freezing chamber, means for adjusting the refrigerant control means, and pressure responsive means associated with the adjusting means and in communication with the product and operable to actuate the adjusting means to adjust the refrigerant control means to raise the temperature maintained thereby when the product is being frozen too rapidly and the back pressure thereof in the freezing chamber increases whereby overloading of the means forcing the product through said chamber is prevented.

4. In a safety device for use with a machine having a freezing chamber, a refrigerating chamber about the freezing chamber, means for forcing a product to be frozen through said freezing chamber under pressure, and means for controlling a refrigerant in said refrigerating chamber and including selectively operable means for maintaining refrigerating and non-refrigerating temperatures about said freezing chamber, adjusting means cooperating with the means in the refrigerant control means for maintaining a refrigerating temperature, and pressure responsive means associated with the adjusting means and communicating with the product and operable to actuate the adjusting means to adjust the means maintaining the refrigerating temperature to raise the refrigerating temperature and to reduce the refrigerating action about said freezing chamber upon a predetermined increase in the back pressure of the product in the freezing chamber.

5. A device including valve means for maintaining a predetermined evaporating pressure in a refrigerating chamber to thereby establish a predetermined refrigerating temperature about a freezing chamber in said refrigerating chamber and through which a product to be frozen is forced under pressure, and means responsive to the product back pressure for adjusting said valve means upon variations of the product back pressure to alter the pressure maintained by said valve means and the refrigerating temperature established thereby.

6. A device including valve means for regulating the evaporating pressure in a refrigerating chamber, means responsive to the evaporating pressure for opening said valve means when a predetermined evaporating pressure is established to thereby maintain a predetermined refrigerating temperature about a freezing chamber in said refrigerating chamber and through which a product to be frozen is forced under pressure, and means responsive to the product back pressure for adjusting the means responsive to the evaporating pressure and operable upon variation of the product back pressure to alter the pressure maintained by said valve means and the refrigerating temperature established thereby.

7. In a device for controlling the evaporating pressure in a refrigerating chamber having a freezing chamber therein through which a product to be frozen is forced under pressure, a valve, yieldable means for maintaining said valve closed, means for opening said valve including pressure responsive means, adjustable means for holding said pressure responsive means against operation until a predetermined pressure is impressed thereon, and means responsive to the back pressure of the product for adjusting said adjustable means to vary the pressure at which said pressure operated means may be operated.

8. In a device for controlling the evaporating pressure in a refrigerating chamber having a freezing chamber therein through which a product to be frozen is forced under pressure, a valve, yieldable means for maintaining said valve closed, means for opening said valve including pressure responsive means, adjustable means for holding said pressure responsive means against operation until a predetermined pressure is impressed thereon, means responsive to the back pressure of the product for adjusting said adjustable means to vary the pressure at which said pressure operated means may be operated, and selectively operable means adapted for cooperation with the adjustable means to increase the evaporating pressure to establish a non-refrigerating temperature about said freezing chamber.

9. A device for controlling the evaporating pressure of a refrigerant in a refrigerating chamber having a freezing chamber therein through which a product to be frozen is forced under pressure, a body having a valve therein for controlling the discharge of refrigerant from said refrigerating chamber to the suction side of the compressor of a refrigerating system, yieldable means for maintaining said valve closed, means in said body and operable by the evaporating pressure of the refrigerant for opening said valve, means responsive to the evaporating pressure of the refrigerant for controlling the flow of refrigerant to the means for opening said valve, yieldable means acting on a part of the pressure responsive means and holding said part against operation until a predetermined pressure is impressed thereon, and means for adjusting said yieldable means to render said part responsive to a pressure differentiated from said predetermined pressure and including an operating part, and means responsive to the product back pressure for operating said operating part.

10. A device for controlling the evaporating pressure of a refrigerant in a refrigerating chamber having a freezing chamber therein through which a product to be frozen is forced under pressure, a body having a valve therein for controlling the discharge of refrigerant from said refrigerating chamber to the suction side of the compressor of a refrigerating system, yieldable means for maintaining said valve closed, means in said body and operable by the evaporating pressure of the refrigerant for opening said valve, means responsive to the evaporating pressure of the refrigerant for controlling the flow of refrigerant to the means for opening said valve, yieldable means acting on a part of the pressure responsive means and holding said part against operation until a predetermined pressure is impressed thereon, means for adjusting said yieldable means to render said part responsive to a pressure differentiated from said predetermined pressure and including a valve stem cooperating with said yieldable means, a closed chamber having a diaphragm therein movable in one direction by the product back pressure, said valve stem cooperating with said diaphragm and being movable in one direction upon an increase in the pressure impressed on said diaphragm, and yieldable means acting on said diaphragm in opposition to the product back pressure impressed thereon.

11. A device including valve means for maintaining a predetermined evaporating pressure in a refrigerating chamber to thereby establish a predetermined refrigerating temperature about a freezing chamber in said refrigerating chamber and through which freezing chamber a product to be frozen is forced under pressure, a housing having a chamber therein, a diaphragm in said chamber, a stem in said housing and engaged with said valve means and said diaphragm, yieldable means urging said diaphragm toward said chamber, and means establishing communication between the freezing chamber and said diaphragm whereby the back pressure of the product in said freezing chamber is effective on said diaphragm, said yieldable means holding said diaphragm against movement until a predetermined product back pressure is impressed thereon, a predetermined product back pressure moving said diaphragm against the action of said yieldable means and moving said stem to adjust said valve means to alter the pressure maintained by said valve means and the refrigerating temperature established thereby.

12. A device for controlling the evaporating pressure of a refrigerant in a refrigerating chamber having a freezing chamber therein through which a product to be frozen is forced under pressure, a body having a valve therein for controlling the discharge of refrigerant from said refrigerating chamber to the suction side of the compressor of a refrigerating system, yieldable means for maintaining said valve closed, means in said body and operable by the evaporating pressure of the refrigerant for opening said valve, means responsive to the evaporating pressure of the refrigerant for controlling the flow of refrigerant to the means for opening said valve, yieldable means acting on a part of the pressure responsive means and holding said part against operation until a predetermined pressure is impressed thereon, means for adjusting said yieldable means to render said part responsive to a pressure differentiated from said predetermined pressure and including a valve stem cooperating with said yieldable means, a closed chamber having a diaphragm therein movable in one direction by the product back pressure, said valve stem cooperating with said diaphragm and being movable in one direction upon an increase in the pressure impressed on said diaphragm, yieldable means acting on said diaphragm in opposition to the product back pressure impressed thereon, and adjusting means interposed between said valve stem and said yieldable means for adjusting the normal tension of said yieldable means.

13. In a continuous ice cream freezer having a freezing chamber, a refrigerating chamber about said freezing chamber, an accumulator supplying liquid refrigerant to said refrigerating chamber and receiving expanded refrigerant from said refrigerating chamber, means for controlling the admission of liquid refrigerant into said accumulator from a refrigerating system, and means for forcing an aerated ice cream mix through said freezing chamber to be frozen therein and including a pipe connecting the forcing means with said freezing chamber, the combination therewith of means for controlling the flow of expanded refrigerant from said accumulator to the compressor of a refrigerating system and including a normally closed valve, means operable by the pressure of the expanded refrigerant for opening said valve, means responsive to the pressure of the expanded refrigerant for controlling the flow of expanded refrigerant to the means for opening said valve and including a diaphragm, spring means for holding said diaphragm against movement until a predetermined expanded refrigerant pressure is impressed thereon, means for tensioning said spring and including a slidable stem, a pressure responsive device, means connecting said pressure responsive device to said pipe whereby the pressure in said pipe determines the operation of said pressure responsive device, and means connecting said pressure responsive device to said slidable stem whereby operation of said pressure responsive device moves said stem and varies the tension of said spring to hold said diaphragm against movement until a pressure differentiated from said predetermined expanded refrigerant pressure is impressed on said diaphragm.

14. A device for use with a freezing apparatus comprising a freezing chamber and a refrigerating chamber for refrigerating said freezing chamber, said device including valve means for maintaining a predetermined refrigerating temperature in the refrigerating chamber, said apparatus including means for forcing a product to be frozen through the freezing chamber under pressure, and means in communication with the product and responsive to the product back pressure for adjusting said valve means upon variations of the product back pressure to vary the refrigerating temperature maintained by said valve means.

15. A safety device for use in a machine in which material is processed under pressure and having refrigerating means for varying the viscosity of the material whereby the back pressure of the material is affected, said safety device including means in communication with the material and responsive to variations in the back pressure of the material, and means operable by the pressure responsive means for adjusting the refrigerating means to thereby alter the back pressure of the material.

16. A safety device for use in a machine in which material is processed under pressure and having refrigerating means for varying the viscosity of the material whereby the back pressure of the material is affected, said safety device including means in communication with the material and responsive to an increase in the back pressure of the material, and means operable by the pressure responsive means for adjusting the refrigerating means to thereby reduce the back pressure of the material.

17. A safety device for use in a machine in which material is processed under pressure and having refrigerating means for varying the viscosity of the material whereby the back pressure of the material is affected and adjustable means for controlling the operation of said refrigerating means, said safety device including means in communication with the material and responsive to variations in the back pressure of the material, and means operable by the pressure responsive means for adjusting the adjustable means to thereby alter operation of the refrigerating means and vary the back pressure of the material.

18. A safety device for use in a machine in which material is processed under pressure and having refrigerating means for varying the viscosity of the material whereby the back pressure of the material is affected and adjustable means for controlling the operation of said refrigerating means, said safety device including means in communication with the material and responsive to an increase in the back pressure of the material, and means operable by the pressure responsive means for adjusting the adjustable means to thereby alter operation of the refrigerating means and reduce the back pressure of the material.

ARTHUR H. BOILEAU.